United States Patent
Li

(10) Patent No.: US 8,676,274 B2
(45) Date of Patent: Mar. 18, 2014

(54) DEVICES, SYSTEMS, AND METHODS FOR NOTIFICATION OF EVENTS ON A WIRELESS COMMUNICATION DEVICE

(75) Inventor: Kevin Ansia Li, Chatham, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 229 days.

(21) Appl. No.: 12/870,392

(22) Filed: Aug. 27, 2010

(65) Prior Publication Data
US 2012/0052922 A1 Mar. 1, 2012

(51) Int. Cl.
*H04M 1/00* (2006.01)
(52) U.S. Cl.
USPC ........ 455/567; 455/41.2; 340/384.6; 340/531
(58) Field of Classification Search
None
See application file for complete search history.

(56) References Cited

U.S. PATENT DOCUMENTS

| | | | |
|---|---|---|---|
| 6,175,763 B1 * | 1/2001 | Sorenson et al. | 604/20 |
| 6,865,907 B2 | 3/2005 | Andrews | |
| 7,130,664 B1 * | 10/2006 | Williams | 455/567 |
| 7,715,873 B1 | 5/2010 | Biere | |
| 7,742,762 B1 * | 6/2010 | Biere et al. | 455/423 |
| 2002/0034970 A1 * | 3/2002 | Higuchi et al. | 455/567 |
| 2002/0115478 A1 * | 8/2002 | Fujisawa et al. | 455/567 |
| 2003/0050011 A1 * | 3/2003 | Palermo et al. | 455/41 |
| 2005/0132290 A1 | 6/2005 | Buchner | |
| 2005/0267544 A1 * | 12/2005 | Lee et al. | 607/46 |
| 2006/0084480 A1 * | 4/2006 | Patino et al. | 455/567 |
| 2007/0087790 A1 * | 4/2007 | Worick et al. | 455/567 |
| 2008/0014989 A1 | 1/2008 | Sandegard | |
| 2008/0293453 A1 * | 11/2008 | Atlas et al. | 455/567 |
| 2008/0303795 A1 * | 12/2008 | Lowles et al. | 345/173 |
| 2009/0082831 A1 * | 3/2009 | Paul et al. | 607/59 |
| 2009/0240113 A1 * | 9/2009 | Heckerman | 600/300 |
| 2010/0188349 A1 * | 7/2010 | Molard et al. | 345/173 |

OTHER PUBLICATIONS

Michael Bosl, "Digital Jewelry," Nov. 13, 2002, <http://komar.cs.stthomas.edu/qm425/02f/Bosl3.htm>.
Jayne Wallace, "Emotionally charged: a practice-centred enquiry of digital jewellery and personal emotional significance," PhD Thesis, Jul. 2007, Sheffield Hallam University, Yorkshire, United Kingdom <http://homepage.mac.com/wallacejayne/PhD%20thesis_files/Jayne_Wallace_PhD_Thesis_1.pdf>.
Cory Doctorow, "Vibrating Bluetooth bracelet helps you get the phone," BoingBoing, Dec. 11, 2007 <http://boingboing.net/2007/12/11/vibrating-bluetooth.html>.
Darren Murph, "Alarming 'Ring' concept vibrates finger to wake you up," The Engadget Show, Jul. 11, 2007, <http://www.engadget.com/2007/07/11/alarming-ring-concept-vibrates-finger-to-wake-you-up/>.
"VIBE Earring Head Phones With Vibration for PMP," Portable Media Player Daily News, Jun. 22, 2007, <http://www.pmptoday.com/2007/06/22/vibe-earring-head-phones-for-pmps/>.

(Continued)

*Primary Examiner* — Zhiyu Lu
(74) *Attorney, Agent, or Firm* — Hartman & Citrin LLC

(57) ABSTRACT

Devices, systems and methods are disclosed which relate to a wearable alert device that emits a physical stimulation upon receiving a signal from a wireless communication device. The wireless communication device is in wireless communication with the wearable alert device, and the wireless communication device sends alerts to the wearable alert device each time it receives an incoming call. The alert is received by the wearable alert device, which in turn emits the physical stimulation to the user wearing it.

16 Claims, 6 Drawing Sheets

(56) References Cited

OTHER PUBLICATIONS

Tom Spring, "IBM Gets Fashionable With Wearable Cell Phone," PCWorld, Nov. 3, 2000, <http://www.pcworld.com/article/33322/ibm_getsfashionable_with_wearable_cell_phone.html>.

"Wearable Computing," Dec. 1, 1995, 1995 Wired Ventures Ltd., <http://archives.obs-us.com/obs/english/books/nn/bd1201.htm>.

Neil Kleinman, "Wearable Wear: Wearable computing in jewelry?" Pen Computing, May 2001, Issue 39, <http://www.pencomputing.com/wearableware/column39.html>.

Tom Spring, "IBM Gets Fashionable with Wearable Cell Phone," Computerworld, Nov. 6, 2000, <http://www.computerworld.com.au/article/76183/ibm_gets_fashionable_wearable_cell_phone/>.

* cited by examiner

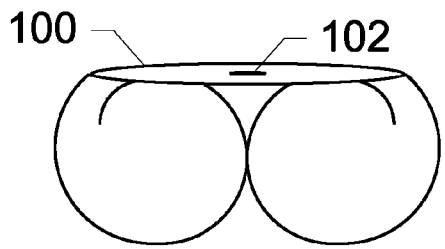
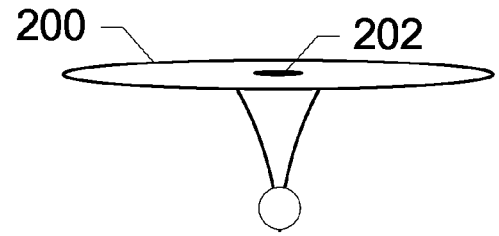
FIG. 1A  FIG. 2A
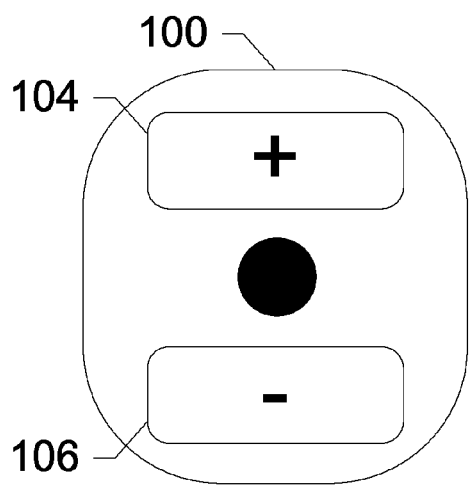
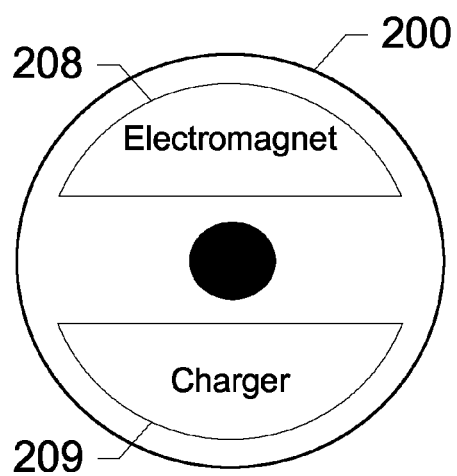
FIG. 1B  FIG. 2B
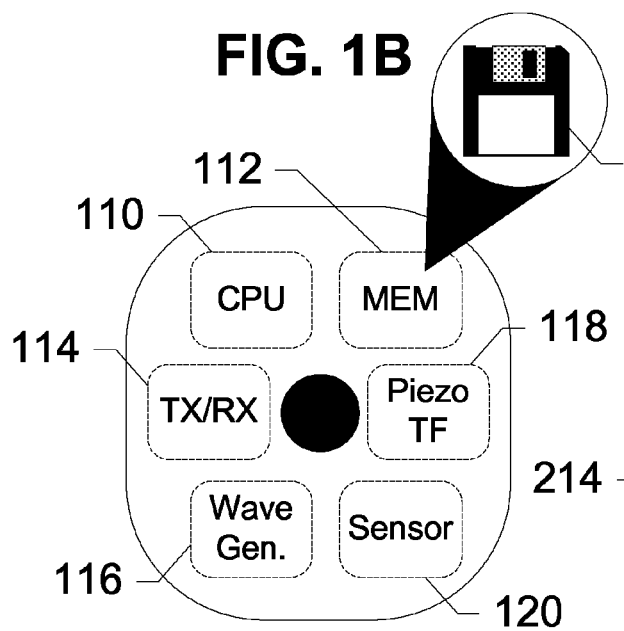
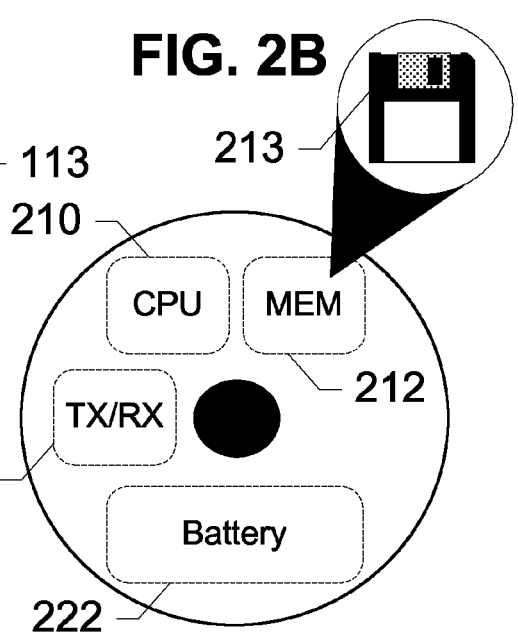
FIG. 1C  FIG. 2C

DEVICES, SYSTEMS, AND METHODS FOR NOTIFICATION OF EVENTS ON A WIRELESS COMMUNICATION DEVICE

BACKGROUND OF THE INVENTION

1. Field of the Invention

The present invention relates to notification. More specifically, the present invention relates to silent notification of an event on a wireless communication device.

2. Background of the Invention

Communications devices, such as cellular phones, have become a common tool of everyday life. Cellular phones are no longer used simply to place telephone calls. With the number of available features rapidly increasing, cellular phones are now used for storing addresses, keeping a calendar, reading e-mails, drafting documents, etc. These devices are small enough that they can be carried in a pocket or purse all day, allowing a user to stay in contact almost anywhere. Recent devices have become highly functional, providing applications useful to business professionals as well as the casual user.

Today, there exist wireless devices that include several different types of transceivers to communicate with varied devices. For instance, a wireless device can include a cellular transceiver, as well as Wi-Fi, and Near-Field Communication (NFC) transceivers, such as BLUETOOTH®, that can be used for several applications.

Most wireless devices have methods of silently alerting the user of an incoming call or other event. Typically, a silent alert is achieved through a vibration mechanism within the wireless device. In other words, the wireless device will vibrate during an incoming call. This alert works fine for males, who typically keep their telephone in their pocket or otherwise close to them. However, women will typically keep their telephones in a purse or other location away from them.

In order to receive a silent alert, women will position their telephone on the side of their purse. Then they will carry the purse with the side of the telephone close to them. This allows them to feel the vibration against the body. Additionally, some users have Bluetooth headsets which are capable of delivering either a silent alert or an alert that only the user can hear. These headsets can be bulky, however, and many do not wear them.

However, many women do have pierced ears, and wear earrings as well as other jewelry. What is needed in the art is an alert mechanism integrated into an article of jewelry or other wearable item.

SUMMARY OF THE INVENTION

The present invention is a wearable alert device that emits a physical stimulation upon receiving a signal from a wireless communication device. In exemplary embodiments, the wireless communication device is in wireless communication with the wearable alert device, and the wireless communication device sends alerts to the wearable alert device each time it receives an incoming call. The alert is received by the wearable alert device, which in turn emits the physical stimulation to the user wearing it. In some exemplary embodiments, the physical stimulation is emitted through electrical contacts. A transformer conditions a supply of electricity to generate a warm or vibrating sensation to the user. Other exemplary embodiments employ one or more electromagnets to generate a pinching or squeezing sensation. Stimulators must be in proximity to the skin of the user, allowing the user to feel electrical or mechanical stimulation.

Furthermore, exemplary embodiments of the wearable alert device include earrings, bracelets, necklaces, rings, etc. Alerts are sent to the wearable alert device in response to received text messages, low battery notification, lost signal, etc., in addition to incoming call alerts. Some exemplary embodiments require a battery for additional power, while other exemplary embodiments are powered by the alert from the wireless communication device. Exemplary embodiments of the wireless communication device include inductive chargers to charge the wearable alert device by holding the wearable alert device and the inductive charger together. Some exemplary embodiments of the wearable alert device charge the battery kinetically from the motion of the user.

In one exemplary embodiment, the present invention is a wearable alert device. The wearable alert device includes a housing worn by a user in proximity to the user's skin, a processor within the housing, a memory in communication with the processor, a stimulation logic on the memory for receiving an alert from a wireless communication device and emitting a physical stimulation upon the user, a transceiver in communication with the processor, and a stimulator in communication with the processor.

In another exemplary embodiment, the present invention is a system for alerting a user of events on a wireless communication device. The system includes a wearable alert device including a stimulator in proximity to a user's skin, a wireless communication device in communication with the wearable alert device, and an alert logic on the wireless communication device for sending an alert to the wearable alert device upon an event. The wearable alert device emits a physical stimulation upon the user when the wearable alert device receives an alert from the wireless communication device.

In yet another exemplary embodiment, the present invention is a method for alerting a user of an event on a wireless communication device, the alert emitted from a wearable alert device including a stimulator. The method includes receiving an alert from a wireless communication device, and emitting a physical stimulation upon the user.

BRIEF DESCRIPTION OF THE DRAWINGS

FIGS. 1A-C show a wearable alert device incorporated into an earring back, according to an exemplary embodiment of the present invention.

FIGS. 2A-C show a wearable alert device incorporated into an earring back, according to an exemplary embodiment of the present invention.

DETAILED DESCRIPTION OF THE INVENTION

Figure 3A:
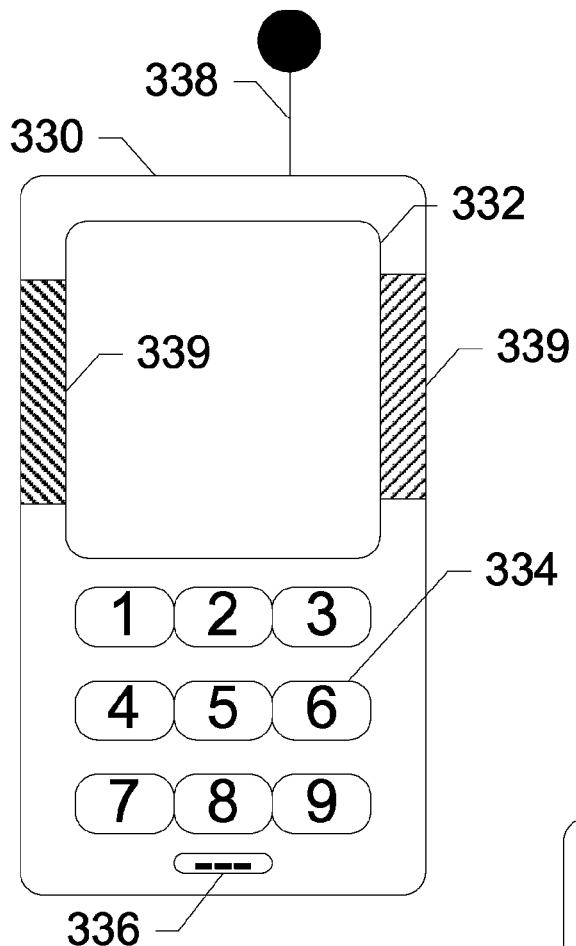
FIGS. 3A-B show a wireless communication device for sending alerts to a wearable alert device, according to an exemplary embodiment of the present invention.

The present invention is a wearable alert device that emits a physical stimulation upon receiving a signal from a wireless communication device. In exemplary embodiments, the wireless communication device is in wireless communication with the wearable alert device, and the wireless communication device sends alerts to the wearable alert device each time it receives an incoming call. The alert is received by the wearable alert device, which in turn emits the physical stimulation to the user wearing it. In some exemplary embodiments, the physical stimulation is emitted through electrical contacts. A transformer conditions a supply of electricity to generate a warm or vibrating sensation to the user. Other exemplary embodiments employ one or more electromagnets to generate a pinching or squeezing sensation. Stimulators must be in proximity to the skin of the user, allowing the user to feel electrical or mechanical stimulation.

Furthermore, exemplary embodiments of the wearable alert device include earrings, bracelets, necklaces, rings, etc. Alerts are sent to the wearable alert device in response to received text messages, low battery notification, lost signal, etc., in addition to incoming call alerts. Some exemplary embodiments require a battery for additional power, while other exemplary embodiments are powered by the alert from the wireless communication device. Exemplary embodiments of the wireless communication device include inductive chargers to charge the wearable alert device by holding the wearable alert device and the inductive charger together. Some exemplary embodiments of the wearable alert device charge the battery kinetically from the motion of the user.

"Wireless communication device", as used herein and throughout this disclosure, refers to any electronic device capable of wirelessly sending and receiving data. A wireless communication device may have a processor, a memory, a transceiver, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

"Logic", as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a telecommunication network, logic may be programmed on a server, or a complex of servers. A particular logic unit is not limited to a single logical location on the telecommunication network.

Wireless communication devices communicate with each other and with other elements via a network, for instance, a wireless network, or a wireline network. A "network" can include broadband wide-area networks such as cellular networks, local-area networks (LAN), and personal area networks, such as near-field communication (NFC) networks including BLUETOOTH®. Communication across a network is preferably packet-based; however, radio and frequency/amplitude modulations networks can enable communication between wireless communication devices using appropriate analog-digital-analog converters and other elements. Communication is enabled by hardware elements called "transceivers." Wireless communication devices may have more than one transceiver, capable of communicating over different networks. For example, a cellular telephone can include a cellular transceiver for communicating with a cellular base station, a Wi-Fi transceiver for communicating with a Wi-Fi network, and a BLUETOOTH® transceiver for communicating with a BLUETOOTH® device. A network typically includes a plurality of elements that host logic for performing tasks on the network.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIGS. 1A-C show a wearable alert device incorporated into an earring back, according to an exemplary embodiment of the present invention. FIG. 1A shows an earring back with the wearable alert device 100 incorporated. An earring equipped with a pin to put through the piercing of an ear fits through an aperture 102, where the pin is held in place. The earring back serves as the housing for this exemplary embodiment, leaving the user the option of using any earring that fits the back.

FIG. 1B shows the outer components of wearable alert device 100 including a positive electric contact 104 and a negative electric contact 106, according to an exemplary embodiment of the present invention. These electrical contacts 104 and 106 touch the skin of the back of a user's ear when properly worn to hold an earring. When an alert is received, conditioned electricity is released through contacts 104 and 106 to stimulate the user. Depending on the wave form, this stimulation resembles a warming sensation, a vibration, etc.

FIG. 1C shows the inner components of wearable alert device 100, according to an exemplary embodiment of the present invention. The inner components include a processor 110, a memory 112 including a stimulation logic 113, a transceiver 114, a piezo-transformer 118, a wave generator 116, and a resistance sensor 120. Wearable alert device 100 uses a passive communication and stimulation system, which does not require a battery. Processor 110, memory 112, and transceiver 114 resemble a contactless integrated circuit, such as used by smartcards, etc. An alert from a wireless communication device powers the circuitry, starting with processor 110, which runs stimulation logic 113. Stimulation logic 113 instructs resistance sensor 120 to measure the resistance of the user's skin. The resistive qualities of human skin can change with temperature and moisture. To avoid shocking the user, the resistance is measured before the stimulation is emitted. Stimulation logic 113 instructs piezo-transformer 118 to condition the power, generally by raising the voltage and lowering the current, to a condition suitable under the current resistance. Finally wave generator 116 uses power from piezo-transformer 118 to deliver the stimulation to the user.

The size and location of the electrical contacts vary across different embodiments. The amount of voltage to use may depend on the surface area of the electrical contacts and their proximity to the user's skin. The electrical contacts directly contact the skin in some embodiments, while the electrical contacts are separated from the skin by a thin cloth, film, or other light insulation, such as in the interest of comfort. For these passive embodiments, the transceiver uses NFC communication, but the exact protocol may vary in embodiments. Though a piezo-transformer may be ideal because of its small size, other forms of transformers may be used to condition the power before delivery of the stimulation. Warm and vibrating sensations are just two of the possibilities of sensations to generate for the user. Many other sensations can be generated depending on pulse width, frequency, and intensity, such as in transcutaneous electrical nerve stimulation (TENS).

FIGS. 2A-C show a wearable alert device incorporated into an earring back, according to an exemplary embodiment of the present invention. FIG. 2A shows wearable alert device 200, which uses a slightly different system for holding an earring. Aperture 202 holds the pin from the earring. The earring back serves as the housing for this exemplary embodiment, leaving the user the option of using any earring that fits the back.

FIG. 2B shows the outer components of wearable alert device 200 including an electromagnet 208, and an inductive charger 209. Electromagnet 208 is activated when an alert is received at wearable alert device 200. Once activated, electromagnet 208 pulls the earring, squeezing the ear lobe of the user in between. This squeezing lets the user know that an incoming call has arrived on their wireless communication device. Charger 209 is an inductive charger, and charges the battery when near a complimentary inductive charger.

FIG. 2C shows the inner components of wearable alert device 200, according to an exemplary embodiment of the present invention. The inner components include a processor 210, a memory 212 including a stimulation logic 213, a transceiver 214, and a battery 222. Wearable alert device 200 uses an active communication and stimulation system, which requires a battery. An alert from a wireless communication device is received by transceiver 214. Processor 210 runs stimulation logic 213 which instructs battery 222 to power electromagnet 208. After powering electromagnet 208, and thus notifying the user of the event, stimulation logic 213 sends a confirmation of the alert back to the wireless communication device.

The size and placement of the inductive charger varies across different embodiments. Since the earring back has a smaller size, the location of the inductive charger may not have much impact on its performance. In some embodiments, the battery is charged through kinetic energy. Some of these kinetically charged embodiments include a rotating pendulum, such as in kinetically powered wrist watches. In further embodiments, the battery is charged through a direct connection. A port or a plug is coupled to the surface for these embodiments. The size of the electromagnet may vary, and a larger surface area increases effectiveness. However, the electromagnet should be placed in a position where it attracts the earring when activated. These active embodiments use a battery and are therefore capable of more function. Including a battery allows the device to use a wide range of wireless technologies. BLUETOOTH® and other personal area network (PAN) wireless technologies are used in many embodiments.

Figure 3B:
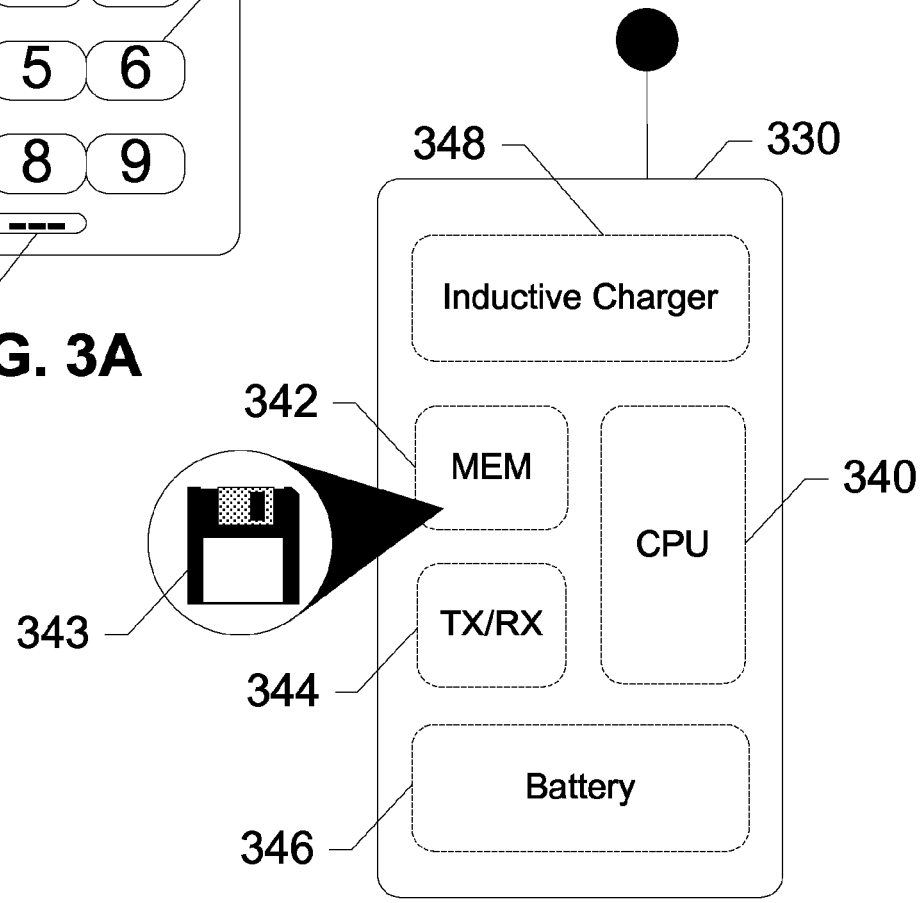

FIGS. 3A-B show a wireless communication device for sending alerts to a wearable alert device, according to an exemplary embodiment of the present invention. FIG. 3A shows the inputs and outputs of a wireless communication device 330. Wireless communication device 330 includes a display 332, an input 334, a microphone 336, an antenna 338, and an inductive charger 339. Display 332 is a liquid crystal display (LCD) screen used to give the user visual output of the activity of wireless communication device 330. Input 334 is a numerical keypad used to receive commands from the user to be performed on wireless communication device 330. Microphone 336 receives aural input, such as voice, from the user for making audio calls or commanding wireless communication device 330. Antenna 338 sends and receives wireless signals from a network, wearable alert device, other wireless communication devices, etc. Inductive charger 339 can charge a battery connected to a complimentary inductive charger, such as inductive charger 209 of FIG. 2B. Inductive charger 339 is positioned on wireless communication device 330 such that a wearable alert device can be charged when the wireless communication device is in use. For instance, a wearable alert device incorporated into an earring back can charge when the user holds wireless communication device 330 up to the ear with the wearable alert device.

FIG. 3B shows the inner components of wireless communication device 330, including a processor 340, a memory 342 including an alert logic 343, a transceiver 344, a battery 346, and an inductive charger 348. Transceiver 344 works with antenna 338 to send and receive wireless signals with a network, wearable alert device, other wireless communication devices, etc. When an incoming call is received from a network, processor 340 runs alert logic 343. Alert logic commands transceiver 344 to send an alert to a wearable alert device. Since the network and wearable alert device may not use the same communication technology, transceiver 344 uses more than one form of communication. Inductive charger 348 is the inner component of inductive charger 339, which charges a nearby device, such as a wearable alert device, when in range. Inductive charger 348 uses power from battery 346 to charge wearable alert device.

In other embodiments of the wireless communication device, the display is a touch screen. A touch screen allows the user to view output on the display as well as use the display to give input. In some touch screen embodiments, the wireless communication device does not have a physical keypad for input. Instead, a virtual keypad is displayed on the touch screen and the user inputs by touching the virtual keys. The size and placement of the induction charger(s) varies greatly across embodiments. Optimal placement depends, in part, on the type of wearable alert device used. For wearable devices that accept a direct connection for charging, the wireless communication device includes a port or a plug to make the connection. Many wireless communication devices have more than one transceiver or a transceiver that supports more than one protocol. For instance, it is not uncommon for a wireless communication device to support cellular radio frequency (RF), WiFi, and BLUETOOTH® protocols. To communicate with wearable alert devices using NFC technology, embodiments of the wireless communication device include RFID or smartcard readers as well.

Figure 4:
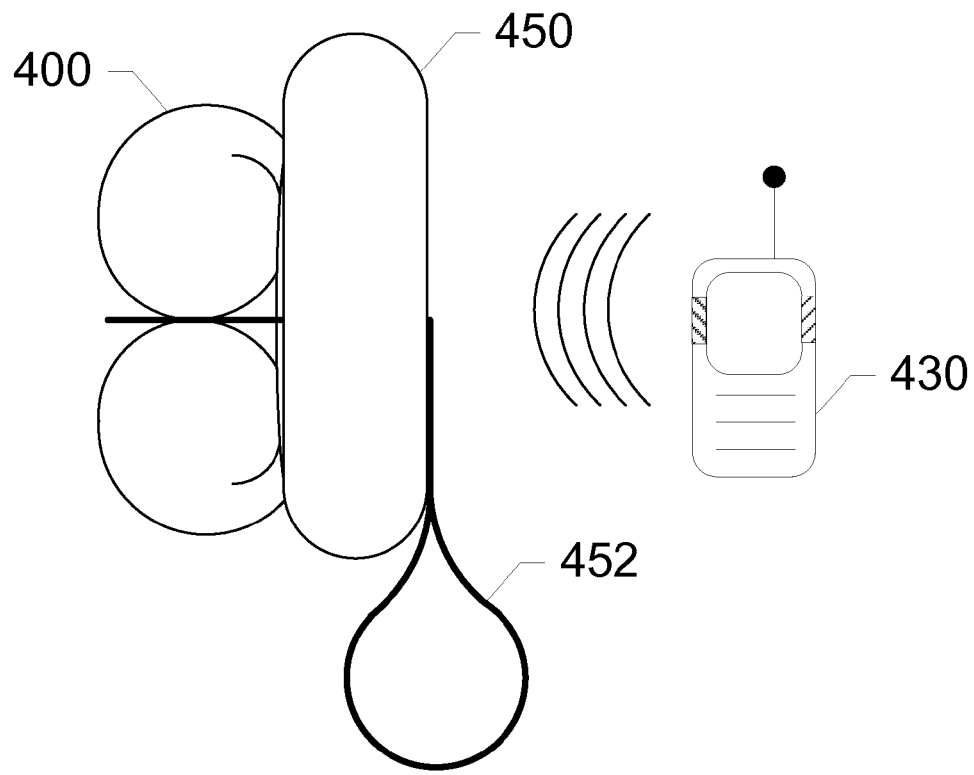
FIG. 4 shows a system for alerting a user of an event on a wireless communication device, according to an exemplary embodiment of the present invention.

FIG. 4 shows a system for alerting a user of an event on a wireless communication device, according to an exemplary embodiment of the present invention. The system includes a wearable alert device 400 incorporated into an earring back, a user's ear lobe 450, an earring 452, and a wireless communication device 430. Earring 452 uses a pin to go through a piercing in ear lobe 450 where it connects to wearable alert device 400. Wireless communication device 430 sends alerts to wearable alert device 400. When wearable alert device 400 receives an alert, a pair of electrical contacts stimulate ear lobe 450 with a warm or vibrating sensation.

Warm and vibrating sensations are just two of the possibilities of sensations to generate for the user. Many other sensations can be generated depending on pulse width, frequency, and intensity, such as in transcutaneous electrical nerve stimulation (TENS).

Figure 5:
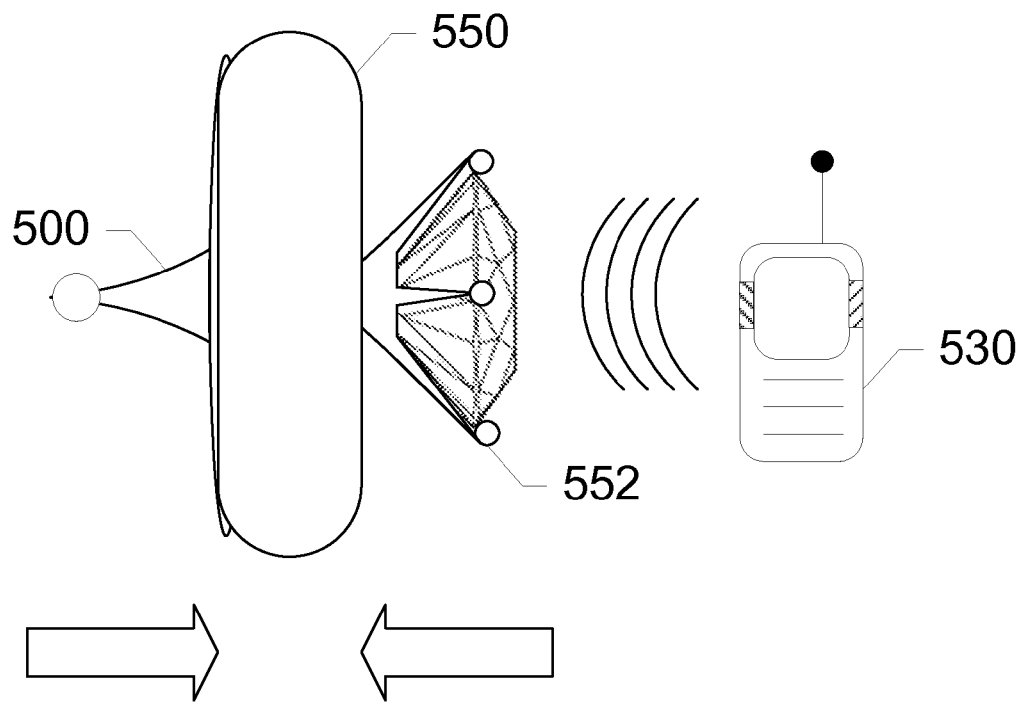
FIG. 5 shows a system for alerting a user of an event on a wireless communication device, according to an exemplary embodiment of the present invention.

FIG. 5 shows a system for alerting a user of an event on a wireless communication device, according to an exemplary embodiment of the present invention. The system includes a wearable alert device 500 incorporated into an earring back, a user's ear lobe 550, an earring 552, and a wireless communication device 530. Earring 552 uses a pin to go through a piercing in ear lobe 550 where it connects to wearable alert device 500. Wireless communication device 530 sends alerts to wearable alert device 500. When wearable alert device 500 receives an alert, an electromagnet coupled to wearable alert device 500 is activated which attracts earring 552. While earring 552 is drawn toward the electromagnet, ear lobe 550 experiences a squeezing sensation, as illustrated by the arrows.

The squeezing sensation is just one of the many sensations that can be created through mechanical means. In other embodiments, a small motor is connected to an eccentric or unbalanced weight to produce a vibrating sensation for the user. In further embodiments, the motor can spin the earring back on the pin of the earring, yielding another sensation for the user. In these spin alert embodiments, the part of the earring back that makes contact with the ear may have different surface textures. A soft padding or cloth in between the wireless alert device and the ear lobe creates a subtle tickle for the user.

Figures 6, 7:
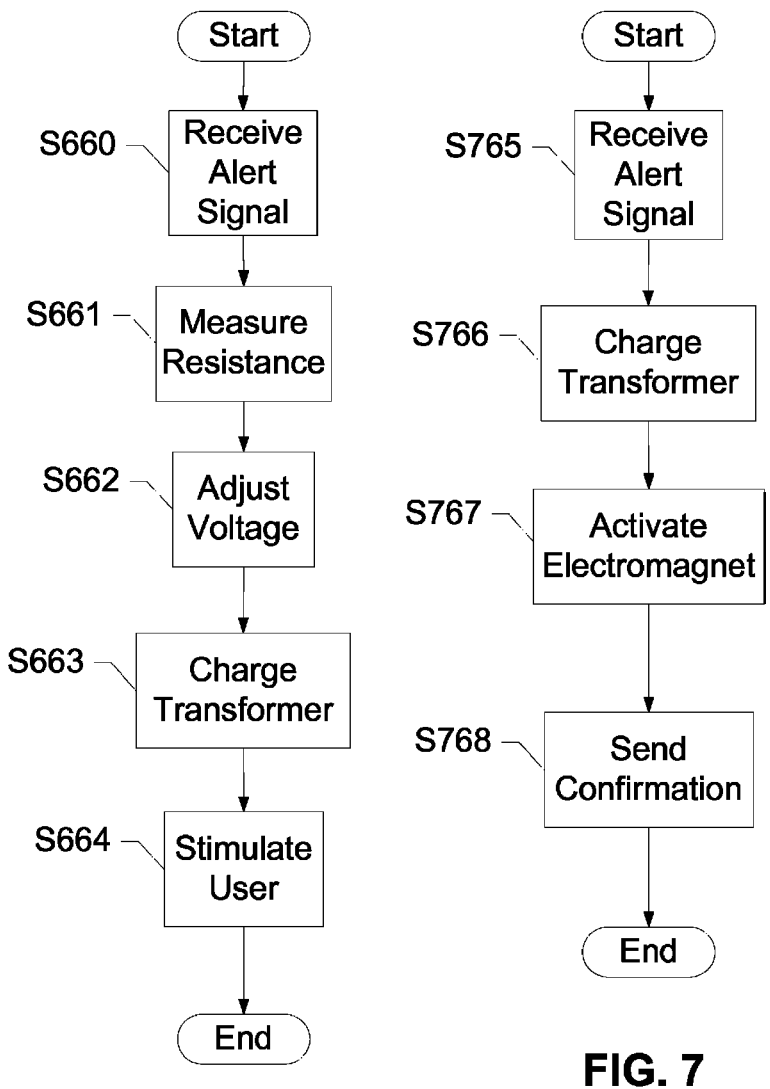
FIG. 6 shows a method for alerting a user with an electrical stimulation, according to an exemplary embodiment of the present invention.
FIG. 7 shows a method for alerting a user with a mechanical stimulation, according to an exemplary embodiment of the present invention.

FIG. 6 shows a method for alerting a user with an electrical stimulation, according to an exemplary embodiment of the present invention. The method starts when a wearable alert device receives an alert signal from a wireless communication device S660. The wearable alert device first uses a resistance sensor to measure the current electrical resistance of the user's skin S661. This electrical resistance measurement is used to calculate the amount of voltage required to stimulate the user. This voltage is then adjusted at a transformer before delivering the stimulation S662. A charge is sent through the transformer S663, and the user feels stimulation in the form of a warm or vibrating sensation S664.

This method resides in the stimulation logic on the memory of the wearable alert device. Typically, more method steps require more power. Therefore, wearable alert devices having batteries are capable of performing more steps than passive devices. In other embodiments, the wearable alert device sends a confirmation to the wireless communication device that the alert has been received and that the stimulation has been delivered. The transformer used is preferably a piezo-transformer. Though a piezo-transformer may be ideal because of its small size, other forms of transformers may be used to condition the power before delivery of the stimulation. Any means for stepping up the voltage may be used.

FIG. 7 shows a method for alerting a user with a mechanical stimulation, according to an exemplary embodiment of the present invention. First, a wearable alert device receives an alert signal from a wireless communication device S765. Once received, the wearable alert device starts charging the transformer S766. Next, the electromagnet is activated S767, which squeezes the ear of the user. Finally, a confirmation of the alert is sent back to the wireless communication device S768.

In embodiments employing other mechanical stimulators, the step of activating the electromagnet changes to activating the appropriate mechanical stimulator. Sending confirmation is an optional step, and passive embodiments without batteries may not include this step to conserve energy. The transformer used is preferably a piezo-transformer. Though a piezo-transformer may be ideal because of its small size, other forms of transformers may be used to condition the power before delivery of the stimulation.

Figure 8A:
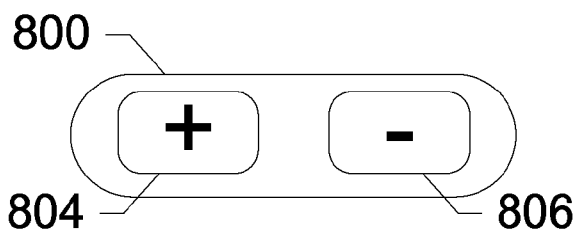
FIGS. 8A-B show a wearable alert device incorporated into a bracelet, according to an exemplary embodiment of the present invention.
Figure 8B:
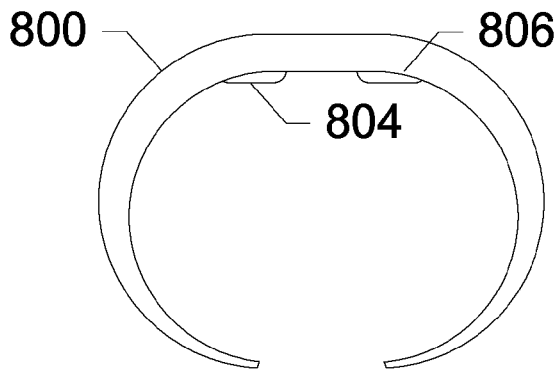

FIGS. 8A-B show a wearable alert device incorporated into a bracelet, according to an exemplary embodiment of the present invention. FIG. 8A shows a wearable alert device 800 including a positive electrical contact 804 and a negative electrical contact 806. These electrical contacts 804 and 806 are on the inside of the bracelet so that they make contact with the skin of the user. The bracelet is worn around a user's wrist, and receives alerts from a wireless communication device. When alerts are received by wearable alert device 800, the user feels stimulation from electrical contacts 804 and 806 in the form of a warm or vibrating sensation. FIG. 8B shows an alternate view of wearable alert device 800 to further clarify the structure. The bracelet itself serves as the housing in this exemplary embodiment.

Figure 9A:
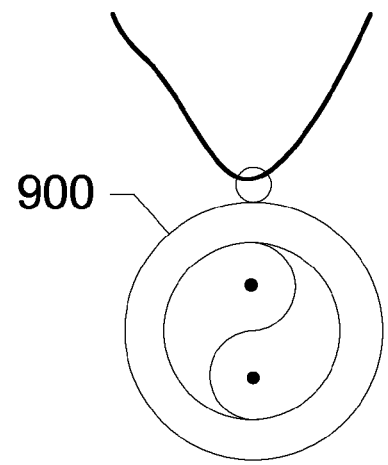
FIGS. 9A-B show a wearable alert device incorporated into a necklace, according to an exemplary embodiment of the present invention.
Figure 9B:
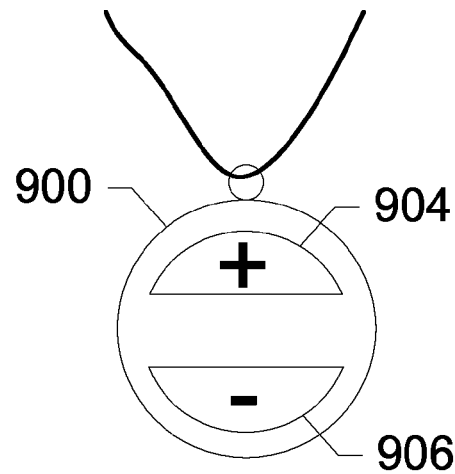

FIGS. 9A-B show a wearable alert device incorporated into a necklace, according to an exemplary embodiment of the present invention. FIG. 9A shows a wearable alert device 900 including a design on the pendant. FIG. 9B shows the side of wearable alert device 900 designed to rest against or in proximity to the skin of the user. Wearable alert device includes positive electrical contact 904 and negative electrical contact 906. When an alert is received from a wireless communication device, the user feels stimulation through electrical contacts 904 and 906 in the form of a warm or vibrating sensation. A pendant serves as the housing in this exemplary embodiment, leaving the user a choice of any necklace to use with the pendant.

Figure 10:
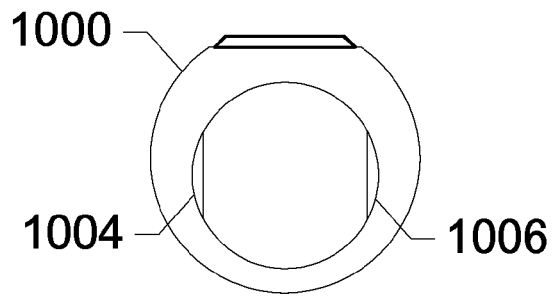
FIG. 10 shows a wearable alert device incorporated into a ring, according to an exemplary embodiment of the present invention.

FIG. 10 shows a wearable alert device incorporated into a ring, according to an exemplary embodiment of the present invention. Wearable alert device 1000 includes a positive electrical contact 1004 and a negative electrical contact 1006. When an alert is received from a wireless communication device, the user feels stimulation through electrical contacts 1004 and 1006 in the form of a warm or vibrating sensation. The ring itself serves as the housing in this exemplary embodiment.

As shown in FIGS. 8-10, the wearable alert device can be incorporated into many articles of jewelry or other wearable items. This includes cufflinks, barrettes, watches, glasses, shoes, etc. Some embodiments of wearable alert devices are incorporated into the article itself, as in the bracelet and ring exemplary embodiments. Other embodiments of the wearable alert device are complimentary to the article, as in the earring back and necklace pendant exemplary embodiments. These complimentary embodiments allow the user to incorporate the wearable alert device into the article of their preference.

Figure 11:
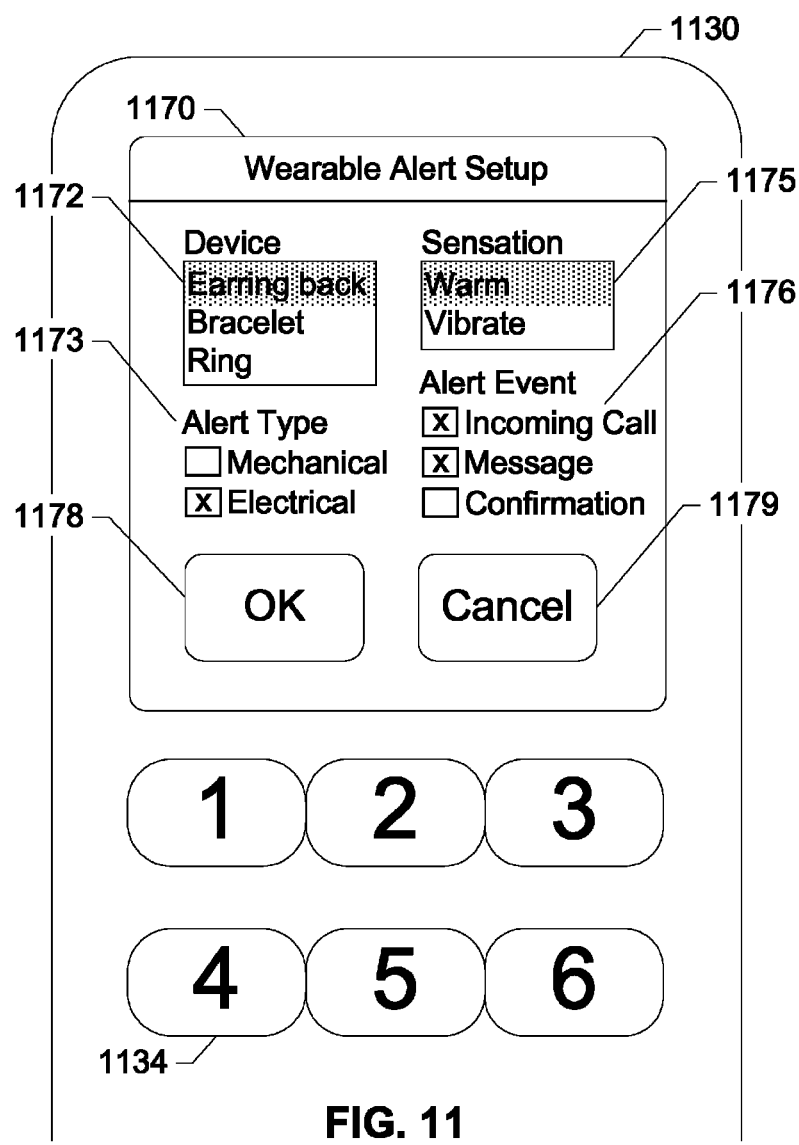
FIG. 11 shows a setup screen for a wearable alert device, according to an exemplary embodiment of the present invention.

FIG. 11 shows a wearable alert setup screen for a wearable alert device, according to an exemplary embodiment of the present invention. Wearable alert setup 1170 includes device selection 1172, alert type selection 1173, sensation selection 1175, alert event selection 1176, a confirmation button 1178, and a cancelation button 1179. Device selection 1172 allows the user to select a wearable alert device to use. In this embodiment, an earring back has been selected. Alert type selection 1173 is used to determine which type of stimulation the selected wearable alert device uses. Once an alert type is selected, sensation selection 1175 is used to choose a preferred type of sensation. In this embodiment, a warm sensation has been selected. Alert event selection 1176 is used to determine which events send an alert to the selected wearable alert device. In this embodiment, the user has selected to be alerted for incoming calls and messages. The user does not desire the selected wearable alert device to send confirmation upon receiving an alert and stimulating the user. Confirmation button 1178 is used to save these settings and exit the setup program. Cancelation button 1179 is used to abort any changed settings and exit the setup program.

There are many options available to a user of a wearable alert device. Some of the options in the setup are automatically detectable. For instance, when the user selects a wearable alert device, the wireless communication device automatically selects the appropriate alert type. Some embodiments of the wearable alert device are capable of multiple alert types, leaving the selection entirely up to the user. The electric stimulation embodiments provide for many more available sensations to the user because the sensation can change by merely varying the pulse width, frequency, and intensity. Fewer options for sensation may exist for mechanical stimulators. Many more alert events are possible to accept in further embodiments. In some embodiments, the user selects a different sensation for each alert event. In further embodiments, the user selects a different sensation for the individual contacts or categories of contacts on the wireless communication device. Many other options will become readily apparent to those having skill in the art upon reading this disclosure.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A device comprising:
 a processor; and
 a memory storing instructions that, when executed by the processor, cause the processor to perform operations comprising:
  determining an alert based upon a selected wearable alert device, wherein the alert corresponds to a physical stimulation;
  determining a voltage based on a resistance measurement, the resistance measurement being a function of at least a skin temperature, a skin moisture, an electrode surface area or an electrode proximity to a skin of a user;
  transmitting the alert to the selected wearable alert device along with the voltage of the alert; and
  receiving, from the selected wearable alert device, a confirmation of delivery of the physical stimulation.

2. The device of claim 1, wherein the operations further comprise receiving a selection of the wearable alert device comprises at least one of an earring back, a bracelet, a ring, or a necklace pendant.

3. The device of claim 1, wherein the wearable alert device comprises a transformer and electrical contacts.

4. The device of claim 3, wherein the wearable alert device further comprises a resistance sensor.

5. The device of claim 1, further comprising an inductive charger coupled to a battery.

6. The device of claim 5, wherein the inductive charger charges the wearable alert device via a complimentary inductive charger on the wearable alert device.

7. The device of claim 1, wherein the wearable alert device comprises an electromagnet.

8. The device in claim 7, wherein the wearable alert device comprises an earring, wherein the alert comprises an activation of the electromagnet, and wherein the activation of the electromagnet causes the earring to move and squeeze an ear of the user.

9. The device in claim 1, wherein communication with the wearable alert device occurs via one of near-field communication, RFID, BLUETOOTH, or WiFi.

10. A wireless communication device comprising:
 a processor; and
 a memory storing a logic that, when executed by the processor, causes the processor to perform operations comprising:
  establishing a communication with a wearable alert device, the wearable alert device comprising a stimulator to apply a voltage to a skin of a user, the wearable alert device being one of a plurality of wearable alert devices selectable via a user interface,
  determining the voltage to apply to the skin of the user based on a resistance measurement, the resistance measurement being a function of at least one of a temperature of the skin, an amount of moisture of the skin, and a proximity of the stimulator to the skin,
  sending an alert along with the voltage to the wearable alert device upon an event, the alert selected from a plurality of alert types based upon the selected wearable alert device, and
  receiving, from the wearable alert device, a confirmation that the physical stimulation has been delivered.

11. The wireless communication device of claim 10, wherein the wireless communication device further comprises an inductive charger.

12. The wireless communication device of claim 11, wherein the inductive charger charges a battery of the wearable alert device.

13. The wireless communication device of claim 10, wherein the wearable alert device is associated with at least one of an earring back, a bracelet, a ring, or a necklace pendant.

14. The wireless communication device of claim 10, wherein the wearable alert device comprises a contactless integrated circuit.

15. A method comprising:
- receiving, by a wireless communication device comprising a processor via a user interface associated with the wireless communication device, a selection of a wearable alert device;
- determining, by the processor, a voltage based on a resistance measurement, the resistance measurement being a function of at least one of a skin temperature, a skin moisture, an electrode surface area or an electrode proximity to a user's skin;
- transmitting, by the processor, an alert to the wearable alert device along with the voltage, the alert selected from among a plurality of alerts based on the selection; and
- receiving, from the wearable alert device, a confirmation that the voltage has been applied to the user's skin.

16. The method of claim 15, further comprising inductively charging the wearable alert device.

* * * * *